US 6,902,326 B1

United States Patent
Ames et al.

(10) Patent No.: US 6,902,326 B1
(45) Date of Patent: Jun. 7, 2005

(54) OFF-AXIS REFLECTIVE OPTICAL APPARATUS

(75) Inventors: Lawrence L. Ames, San Jose, CA (US); David F. Leary, Palo Alto, CA (US); Paul V. Mammini, Rocklin, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/349,758

(22) Filed: Jan. 22, 2003

(51) Int. Cl.[7] ................................................. G02B 6/38
(52) U.S. Cl. .............................. 385/60; 385/72; 385/78
(58) Field of Search ............................. 385/60, 61, 72, 385/74, 78, 79

(56) References Cited

U.S. PATENT DOCUMENTS

| | | | | |
|---|---|---|---|---|
| 5,090,803 A | * | 2/1992 | Ames et al. | 359/529 |
| 5,291,570 A | * | 3/1994 | Filgas et al. | 385/78 |
| 5,452,392 A | * | 9/1995 | Baker et al. | 385/84 |
| 6,483,982 B1 | * | 11/2002 | Takahashi | 385/140 |

FOREIGN PATENT DOCUMENTS

WO        WO 3021319 A2 * 3/2003 ............ G02B/6/38

* cited by examiner

Primary Examiner—Michael G. Lee
Assistant Examiner—Uyen-Chau N. Le
(74) Attorney, Agent, or Firm—McDermott, Will & Emery

(57) ABSTRACT

Embodiments of the present invention are directed to a simple apparatus and a convenient and accurate method of mounting the components to form an off-axis reflective optical apparatus such as a collimator. In one embodiment, an off-axis reflective optical apparatus comprises a mounting block having a ferrule holder support surface and an off-axis reflector support surface which is generally perpendicular to the ferrule holder support surface. An optical reflector is mounted on the off-axis reflector support surface and has a reflected beam centerline. The optical reflector has a conic reflective surface and a conic center. A ferrule holder is mounted on the ferrule holder support surface. The ferrule holder provides a ferrule for coupling to an optical fiber and orienting a fiber tip of the optical fiber along a fiber axis toward the optical reflector. The fiber axis is nonparallel to the reflected beam centerline. Prior to mounting the optical reflector to the off-axis reflector support surface and prior to mounting the ferrule holder to the ferrule holder support surface, the optical reflector is movable on the off-axis reflector surface and the ferrule holder is movable on the ferrule holder support surface to align the conic center of the optical reflector with respect to the fiber tip of the optical fiber, and the apparatus has at least one of the following features: (1) the optical reflector is movable on the off-axis reflector support surface to adjust a focus of the fiber tip with respect to the optical reflector, and (2) the ferrule holder is movable on the ferrule holder support surface to adjust the focus of the fiber tip with respect to the optical reflector.

24 Claims, 2 Drawing Sheets

OFF-AXIS REFLECTIVE OPTICAL APPARATUS

STATEMENT AS TO RIGHTS TO INVENTIONS MADE UNDER FEDERALLY SPONSORED RESEARCH OR DEVELOPMENT

The invention described herein was made in the performance of work under NASA Contract No. NAS7-1407 and is subject to provisions of Section 305 of the National Aeronautics and Space Act of 1958 (42 U.S.C. 2457).

CROSS-REFERENCES TO RELATED APPLICATIONS

NOT APPLICABLE

BACKGROUND OF THE INVENTION

The present invention relates generally to optical apparatus and, more particularly, to an off-axis conic reflective optical apparatus such as a collimator.

Collimators are optical devices, belonging to a family of devices known as collimators or telescopes, which include products called beam expanders and condensers. Such devices increase or decrease the size of and change the divergence or angular characteristics of a light beam passed therethrough. Such devices also have other characteristics and functions known to those skilled in the trade. Collimators are used in various applications such as laser interferometers, devices employing a tracking or marker beam, laser-equipped machine tool industry, and the like.

Collimators may be constructed of transmissive optics such as lenses through which the light beam is passed. Use of transmissive collimators with lasers with power levels higher than about three kilowatts/m$^2$ becomes increasingly problematic due to limits on energy density that transmissive optic materials can withstand and due to a phenomenon called thermal lending. Thermal lensing is the distortion of an optical component caused by heat absorption typically from an input beam of light. The distortion can influence the divergence and mode quality of the beam passing through or reflecting from the optical component and cause detrimental shifts of focus position and diameter. Lenses are more sensitive to thermal drift due to changes in the optic's index of refraction. In addition, focusing or collimating the beam for space or other in-vacuum applications is complicated by the change in the relative index of refraction between vacuum and in-air.

Collimators may also be constructed of reflective optics, combinations of flat and shaped mirrors, such that the light beam is reflected from these optical elements. Reflective optical materials can withstand greater energy densities without damage and thermal lensing is not as severe in reflective optics as in transmissive optics. Thus reflective collimators are more suitably used in high power laser applications or in applications where even slight thermal lensing is undesirable or unacceptable. Some known reflective collimators consist of several (e.g., four) reflective optics. By adjusting the distance between specific optics the divergence of the output beam can be varied. The mounting and alignment of optical components in a reflective collimator, however, can be complicated and can introduce inaccuracies. It is advantageous to reduce the number of optical components used in the beam delivery system. Each optic adds complexity to the task of aligning a beam path, is a possible source of beam distortion and absorbs some energy from the beam reducing overall system efficiency. Optical elements degrade with use. Each optical element adds to the overall cost of system maintenance.

Reflective collimators typically employ parabolic reflectors, although other conic sections such as elliptical reflectors have been used. Existing assemblies utilizing parabolic or other conic reflective surfaces often involve complex packaging, adjustment, alignment, and mounting techniques. Moreover, on-axis parabolic collimators produce beams that are corrupted by shadows due to the existence of a hole in the center for the exit (or entrance) pupil. Existing off-axis collimator assemblies are even more complex than on-axis collimator assemblies, and involve additional mounting and alignment components.

BRIEF SUMMARY OF THE INVENTION

Embodiments of the present invention are directed to a simple apparatus and a convenient and accurate method of mounting the components to form an off-axis reflective optical apparatus such as a collimator. The invention does so by providing a mounting block having precisely arranged mounting surfaces for the ferrule holder which positions the fiber tip of the optical fiber and for the off-axis optical reflector. The off-axis optical apparatus provides an unobstructed reflected or collimated beam (i.e. with no hole therein) to pass through the exit (or entrance) pupil.

In accordance with an aspect of the present invention, an off-axis reflective optical apparatus comprises a mounting block having a ferrule holder support surface and an off-axis reflector support surface which is generally perpendicular to the ferrule holder support surface. An optical reflector is mounted on the off-axis reflector support surface and has a reflected beam centerline. A ferrule holder is mounted on the ferrule holder support surface. The ferrule holder provides a ferrule for coupling to an optical fiber and orienting a fiber tip of the optical fiber along a fiber axis toward the optical reflector. The fiber axis is nonparallel to the reflected beam centerline. The optical reflector is movable on the off-axis reflector surface in a direction generally parallel to an axis which is perpendicular to the ferrule holder support surface, prior to being mounted on the off-axis reflector support surface. The ferrule holder is movable on the ferrule holder support surface in a direction generally parallel to an axis which is perpendicular to the off-axis reflector support surface, prior to being mounted on the ferrule holder support surface. The apparatus has at least one of the following features: (1) the optical reflector is movable on the off-axis reflector support surface in a direction generally parallel to the ferrule holder support surface prior to being mounted on the off-axis reflector support surface, and (2) the ferrule holder is movable on the ferrule holder support surface in a direction generally parallel to the off-axis reflector support surface prior to being mounted on the ferrule holder support surface.

In some embodiments, the ferrule holder is rotatable on the ferrule holder support surface relative to an axis which is generally perpendicular to the ferrule holder support surface, prior to being mounted on the ferrule holder support surface. The optical reflector is mounted on the off-axis reflector support surface by an adhesive and the ferrule holder is mounted on the ferrule holder support surface by an adhesive. The ferrule holder support surface and the off-axis reflector support surface are planar surfaces, the ferrule holder has a planar surface mounted on the ferrule holder support surface, and the optical reflector has a planar surface mounted on the off-axis reflector support surface. The mounting block is movable in a direction generally parallel to an axis which is perpendicular to the ferrule holder support surface. The mounting block is rotatable relative to an axis which is generally perpendicular to the ferrule holder support surface and is rotatable relative to another axis which is generally perpendicular to the off-axis reflector support surface. A fold mirror may be disposed in a path of the reflected beam centerline.

In accordance with another aspect of the invention, an off-axis reflective optical apparatus comprises a mounting block having a ferrule holder support surface and an off-axis reflector support surface which is generally perpendicular to the ferrule holder support surface. An optical reflector is mounted on the off-axis reflector support surface and has a reflected beam centerline. The optical reflector has a conic reflective surface and a conic center. A ferrule holder is mounted on the ferrule holder support surface. The ferrule holder provides a ferrule for coupling to an optical fiber and orienting a fiber tip of the optical fiber along a fiber axis toward the optical reflector. The fiber axis is nonparallel to the reflected beam centerline. Prior to mounting the optical reflector to the off-axis reflector support surface and prior to mounting the ferrule holder to the ferrule holder support surface, the optical reflector is movable on the off-axis reflector surface and the ferrule holder is movable on the ferrule holder support surface to align the conic center of the optical reflector with respect to the fiber tip of the optical fiber, and the apparatus has at least one of the following features: (1) the optical reflector is movable on the off-axis reflector support surface to adjust a focus of the fiber tip with respect to the optical reflector, and (2) the ferrule holder is movable on the ferrule holder support surface to adjust the focus of the fiber tip with respect to the optical reflector.

Another aspect of the present invention is directed to a method of mounting components in an off-axis reflective optical apparatus. The method comprises providing a mounting block having a ferrule holder support surface and an off-axis reflector support surface which is generally perpendicular to the ferrule holder support surface, and placing an optical reflector on the off-axis reflector support surface. The optical reflector has a reflected beam centerline, a conic reflective surface, and a conic center. A ferrule holder is placed on the ferrule holder support surface, and provides a ferrule for coupling to an optical fiber and orienting a fiber tip of the optical fiber along a fiber axis to direct an incident light beam toward the optical reflector. The fiber axis is nonparallel to the reflected beam centerline. The optical reflector is moved on the off-axis reflector surface and the ferrule holder is moved on the ferrule holder support surface to align the conic center of the optical reflector with respect to the fiber tip of the optical fiber. The method further comprises moving at least one of (1) the optical reflector on the off-axis reflector support surface and (2) the ferrule holder on the ferrule holder support surface, to adjust a focus of the fiber tip with respect to the optical reflector. The optical reflector is mounted to the off-axis reflector support surface and the ferrule holder is mounted to the ferrule holder support surface.

BRIEF DESCRIPTION OF THE DRAWINGS

FIG. 1a is a simplified elevational schematic view of a portion of the off-axis reflective collimator of FIG. 1.

DETAILED DESCRIPTION OF THE INVENTION

Figure 1:
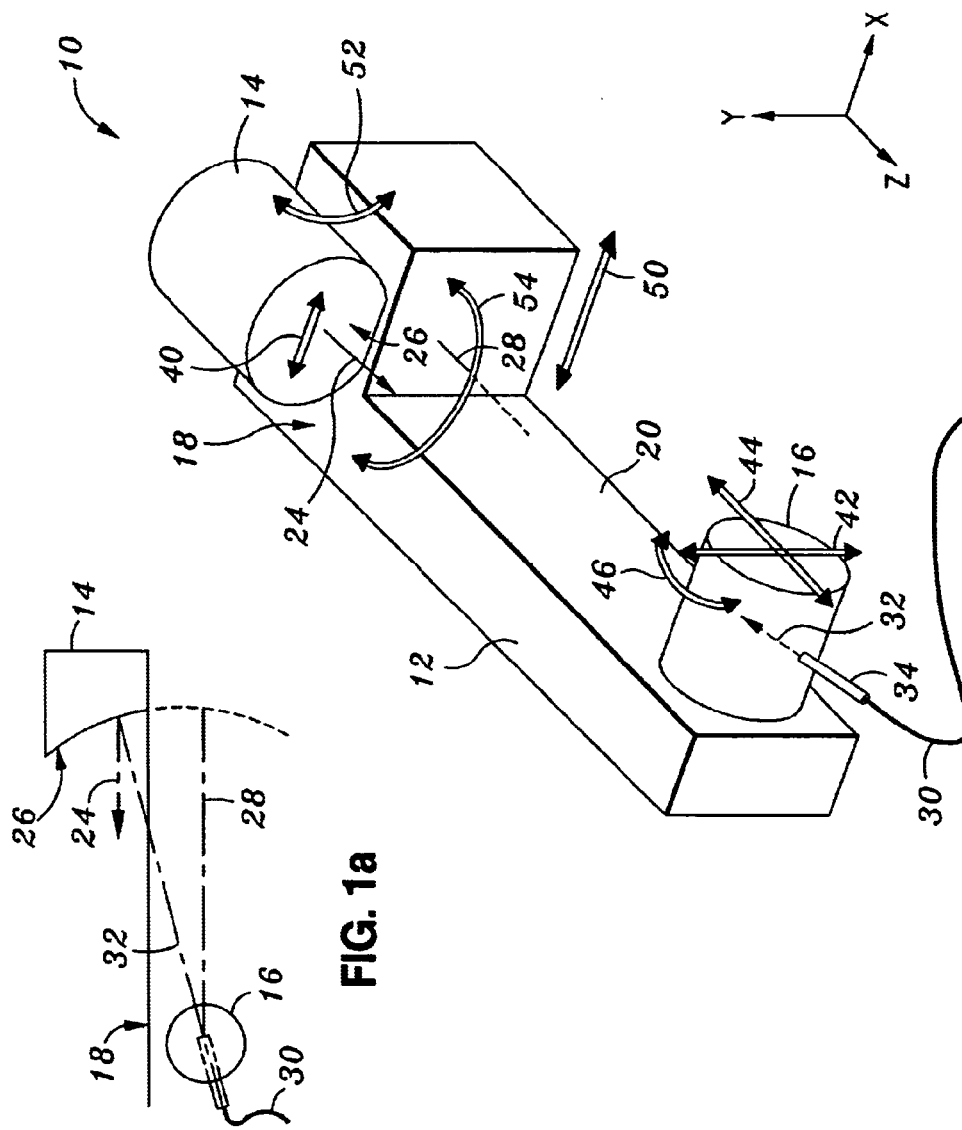
FIG. 1 is a simplified schematic diagram of an off-axis reflective collimator according to an embodiment of the present invention.

FIG. 1 shows an off-axis reflective collimator or optical apparatus 10 which includes a mounting block 12 for mounting an optical reflector 14 and a ferrule holder 16. The optical reflector 14 is disposed on an off-axis reflector support surface 18 of the mounting block 12, which is desirably a planar surface. The ferrule holder 16 is disposed on a ferrule holder support surface 20 of the mounting block 12, which is desirably a planar surface. In the embodiment shown, the off-axis reflector support surface 18 is generally perpendicular to the ferrule holder support surface 20.

The optical reflector 14 has a reflected beam axis or centerline 24 along which a reflected beam will be directed. The reflective surface 26 of the optical reflector 14 is typically a conic reflective surface such as a parabola. The conic reflective surface has a conic center which lies on the reflector axis 28 which passes through the tip of the optical fiber 30 as illustrated in FIG. 1a. The optical reflector 14 has a planar surface which contacts the off-axis reflector support surface 18.

The ferrule holder 16 provides a ferrule for coupling to an optical fiber 30. In the embodiment shown in FIG. 1, the ferrule is disposed inside the ferrule holder and is used to orient a fiber tip of the optical fiber 30 to direct an incident light beam along a fiber axis 32 toward the optical reflector 14. A strain relief 34 is typically provided at the connection between the optical fiber 30 and the ferrule. The fiber axis 32 is nonparallel to the reflected beam centerline 24. The ferrule holder 16 has a planar surface which contacts the ferrule holder support surface 20.

While not required in all applications, the collimator can accommodate the use of polarizing ("PZ") or polarization-maintaining ("PM") fiber. The orientation of the polarization of the beam can be adjusted by rotating the fiber/ferrule assembly with respect to the ferrule holder 16, with a rotation about the axis of the beam 32.

For convenience, an x-y-z coordinate system is used to describe the adjustments that can be made to the optical reflector 14 and the ferrule holder 16 before mounting them to the mounting block 12. The off-axis reflector support surface 18 is perpendicular to the y axis. The ferrule holder support surface 20 is perpendicular to the x axis. The components of the collimator 10 can be adjusted to align the conic center of the optical reflector 14 with respect to the fiber tip of the optical fiber 30 which is held by the ferrule in the ferrule holder 16. This is achieved by adjusting the x and y positions between the optical reflector 14 and the ferrule holder 16. As shown in FIG. 1, the optical reflector 14 is slidable on the off-axis reflector support surface 18 in a direction 40 generally parallel to the x axis and the ferrule holder 16 is slidable on the ferrule holder support surface 20 in a direction 42 generally parallel to the y axis to align the conic center of the optical reflector 14 with respect to the fiber tip of the optical fiber 30 in the ferrule holder 16.

The ferrule holder 16 is slidable on the ferrule holder support surface 20 in a direction 44 generally parallel to the z axis to adjust the focus of the fiber tip of the optical fiber 30 with respect to the optical reflector 14. Alternatively or additionally, the optical reflector 14 may be slidable on the off-axis reflector support surface 18 in the z direction 44 to adjust the focus of the fiber tip of the optical fiber 30 with respect to the optical reflector 14. In addition, the beam height of the reflected beam which is reflected by the optical reflector 14 of the incident beam from the optical fiber 30, as measured in the y direction with respect to the off-axis reflector support surface 18, can be adjusted by rotating the ferrule holder 16 relative to the x axis in the direction 46.

After the above adjustments are made to align the conic center of the optical reflector 14, the adjust the focus of the fiber tip of the optical fiber 30, and to adjust the beam height of the reflected beam from the optical reflector 14, the optical reflector 14 is mounted to the off-axis reflector support surface 18 and the ferrule holder 16 is mounted to the ferrule holder support surface 20. Any suitable mechanisms or methods may be used including, for example, the use of an adhesive, tack bonding, optical contacting, or the like. One type of adhesive that may be used is a UV cured glue which has a coefficient of thermal expansion on the order of about $10^{-4}$ per degree Kelvin. Such a low thermal coefficient is advantageous to reduce errors due to thermal effects to as low as 10 picometer per milli-Kelvin. The UV cured glue is flexible when applied, joins the components by solution bonding, and sets after a short period of time under exposure to UV light.

The mounting block 12 may also be movable to provide additional adjustment of the reflected beam which is typically a collimated beam as reflected by the optical reflector 14 of the incident beam from the optical fiber 30. As shown in FIG. 1, the mounting block 12 may be movable in a direction 50 generally parallel to the x axis to adjust the lateral position of the reflected beam. A precision linear stage or the like may be used to move the mounting block 12 in the direction 50. The mounting block 20 may be rotatable in a direction 52 relative to the x axis to adjust a pitch of the reflected beam. More typically, the mounting block 20 is attached on a flat baseplate. Instead of rotating the mounting block 20 to adjust the pitch, the orientation of the reflected beam 24 in pitch 52 is set by precision machining of the flat portion at the base of the optical reflector 14 (e.g., accuracy within 2 arc-minutes). Additionally, the ferrule assembly 16 may be repositioned slightly off-position vertically along direction 42) if necessary. This moves the fiber tip away from the vertex of the optical reflector 14, causing a desired change in the beam orientation (to align the beam and correct for manufacturing tolerances) while causing a calculable (and generally acceptably small) distortion of the wavefront quality. The mounting block 20 may also be rotatable in a direction 54 relative to the y axis to adjust a yaw of the reflected beam. The rotation may be controlled using a rotary stage or a goniometer.

Figure 2:
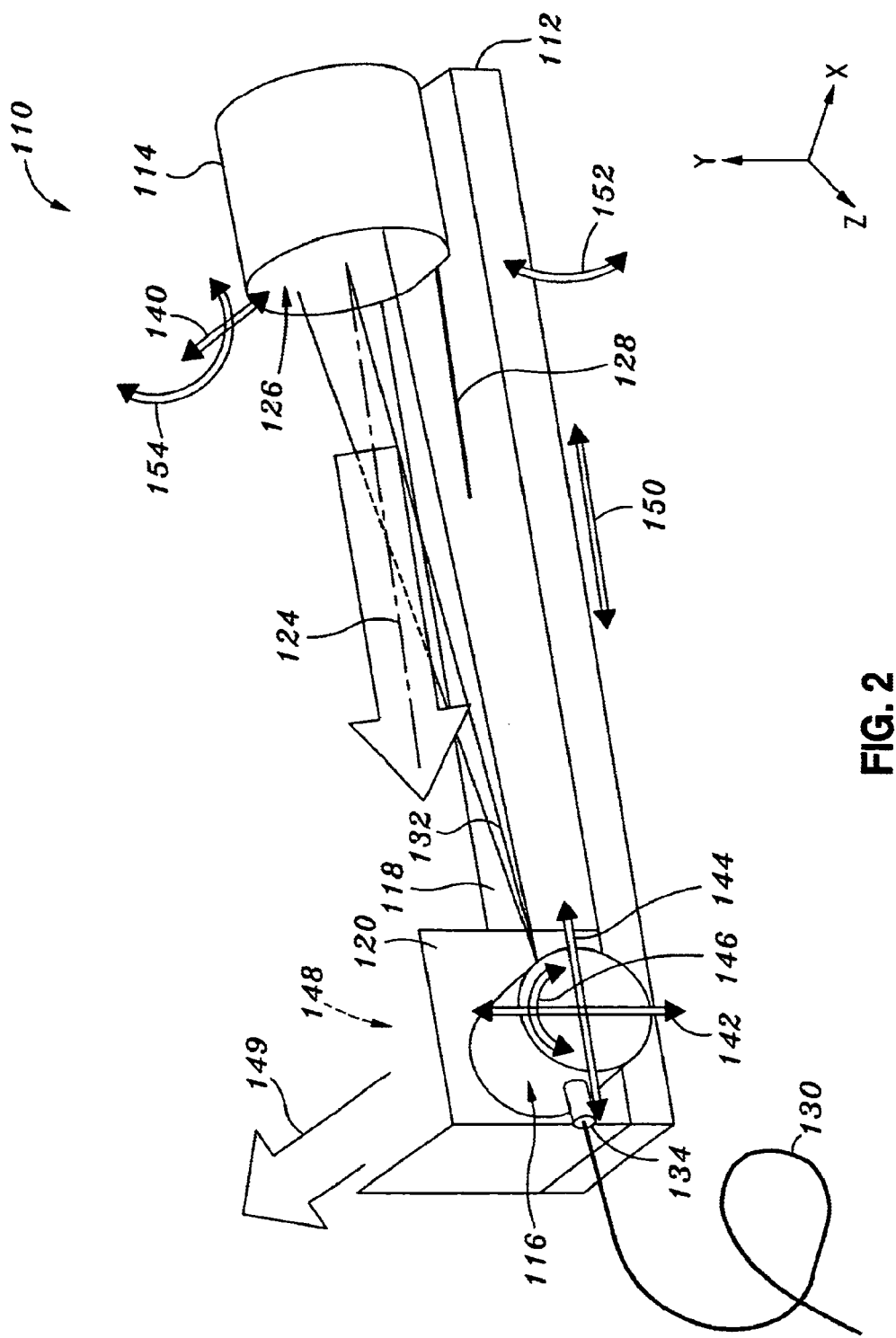
FIG. 2 is a simplified schematic diagram of an off-axis reflective collimator according to another embodiment of the present invention.

In another embodiment shown in FIG. 2, the positions of the components are different from those in FIG. 1, but the alignment, adjustment, and mounting procedures are similar. The optical reflector 14 and the reflected beam in FIG. 1 are disposed at a height above the ferrule holder 16. In FIG. 2, the optical reflector and the reflected beam are disposed at about the same height as the ferrule holder.

As shown in FIG. 2, an off-axis reflective collimator or optical apparatus 110 includes a mounting block 112 for mounting an optical reflector 114 and a ferrule holder 116. The optical reflector 114 is disposed on an off-axis reflector support surface 118 of the mounting block 112, which is desirably a planar surface. The ferrule holder 116 is disposed on a ferrule holder support surface 120 of the mounting block 112, which is desirably a planar surface. In the embodiment shown, the off-axis reflector support surface 118 is generally perpendicular to the ferrule holder support surface 120.

The optical reflector 114 has a reflected beam centerline 124 along which a reflected beam will be directed. The reflective surface 126 of the optical reflector 114 is typically a conic reflective surface such as a parabola The conic reflective surface has a conic center which lies on the reflector axis 128. The optical reflector 114 has a planar surface which contacts the off-axis reflector support surface 118.

The ferrule holder 116 provides a ferrule for coupling to an optical fiber 130. The ferrule is disposed inside the ferrule holder 116 and is used to orient a fiber tip of the optical fiber 130 to direct an incident light beam along a fiber axis 132 toward the optical reflector 114. A strain relief 134 is typically provided at the connection between the optical fiber 130 and the ferrule. The fiber axis 132 is nonparallel to the reflected beam centerline 124. The ferrule holder 116 has a planar surface which contacts the ferrule holder support surface 120. As discussed above, the collimator can accommodate the use of polarizing ("PZ") or polarization-maintaining ("PM") fiber. The orientation of the polarization of the beam can be adjusted by rotating the fiber/ferrule assembly with respect to the ferrule holder 116, with a rotation about the axis of the beam 132.

For convenience, an x-y-z coordinate system is used to describe the adjustments that can be made to the optical reflector 114 and the ferrule holder 116 before mounting them to the mounting block 112. The off-axis reflector support surface 118 is perpendicular to the y axis. The ferrule holder support surface 120 is perpendicular to the x axis. The components of the collimator 110 can be adjusted to align the conic center of the optical reflector 114 with respect to the fiber tip of the optical fiber 130 which is held by the ferrule in the ferrule holder 116. This is achieved by adjusting the x and y positions between the optical reflector 114 and the ferrule holder 116. As shown in FIG. 2, the optical reflector 114 is slidable on the off-axis reflector support surface 118 in a direction 140 generally parallel to the x axis and the ferrule holder 116 is slidable on the ferrule holder support surface 120 in a direction 142 generally parallel to the y axis to align the conic center of the optical reflector 114 with respect to the fiber tip of the optical fiber 130 in the ferrule holder 116.

The ferrule holder 116 is slidable on the ferrule holder support surface 120 in a direction 144 generally parallel to the z axis to adjust the focus of the fiber tip of the optical fiber 130 with respect to the optical reflector 114. Alternatively or additionally, the optical reflector 114 may be slidable on the off-axis reflector support surface 118 in the z direction 144 to adjust the focus of the fiber tip of the optical fiber 130 with respect to the optical reflector 114. In addition, the beam height of the reflected beam which is reflected by the optical reflector 114 of the incident beam from the optical fiber 130, as measured in the y direction with respect to the off-axis reflector support surface 118, can be adjusted by rotating the ferrule holder 116 relative to the x axis in the direction 146.

After the above adjustments are made to align the conic center of the optical reflector 114, the adjust the focus of the fiber tip of the optical fiber 130, and to adjust the beam height of the reflected beam from the optical reflector 114, the optical reflector 114 is mounted to the off-axis reflector support surface 118 and the ferrule holder 16 is mounted to the ferrule holder support surface 120. Any suitable mechanisms or methods may be used including, for example, the use of an adhesive, tack bonding, optical contacting, or the like. In the embodiment shown, a fold mirror 148 is disposed in the path 124 of the reflected beam to redirect the beam to another path 149, which may be about 90° from the path 124 and generally parallel to the x axis.

The mounting block 112 may also be movable to provide additional adjustment of the reflected beam which is typically a collimated beam as reflected by the optical reflector 114 of the incident beam from the optical fiber 130. As shown in FIG. 2, the mounting block 112 may be movable in a direction 150 generally parallel to the z axis to adjust the lateral position of the reflected beam along the beam path 149. A precision linear stage or the like may be used to move the mounting block 112 in the direction 150. The mounting block 120 may be rotatable in a direction 152 relative to the z axis to adjust a pitch of the reflected beam. The mounting block 120 may also be rotatable in a direction 154 relative to the y axis to adjust a yaw of the reflected beam. The rotation may be controlled using a rotary stage or a goniometer.

All of the degrees of freedom necessary for alignment and beam conditioning are accommodated in the present apparatus, and most are straightforward to adjust with the appropriate fixturing. The polarization of the beam is adjusted by changing the orientation of the optical fiber and ferrule in the ferrule holder. The focus is adjusted by changing the z axis, position of the ferrule holder. The beam height is adjusted by rotating the ferrule holder. Manufacturing inaccuracies of the off-axis optical reflectors (e.g., the vertex position of the parabola) are compensated for by adjusting the height of the ferrule holder in the y direction and the horizontal position of the optical reflector in the x direction. The lateral position and the pitch and yaw of the outgoing beam may be made by moving and rotating the mounting block. These adjustments may be made utilizing assembly fixturings, and the components are then mounted in place for stability using adhesives or the like.

The above-described arrangements of apparatus and methods are merely illustrative of applications of the principles of this invention and many other embodiments and modifications may be made without departing from the spirit and scope of the invention as defined in the claims. For instance, the optical reflector is typically configured to provide a collimated beam, but may also be configured to provide a converging beam or a diverging beam in alternate embodiments. FIGS. 1 and 2 merely present examples of mounting the optical reflector and the ferrule holder to achieve the desired off-axis reflection, but other arrangements of the components using a mounting block may be employed. The scope of the invention should, therefore, be determined not with reference to the above description, but instead should be determined with reference to the appended claims along with their full scope of equivalents.

What is claimed is:

1. An off-axis reflective optical apparatus comprising:

a mounting block having a ferrule holder support surface and an off-axis reflector support surface which is generally perpendicular to the ferrule holder support surface;

an optical reflector mounted on the off-axis reflector support surface and having a reflected beam centerline; and a ferrule holder mounted on the ferrule holder support surface, the ferrule holder providing a ferrule for coupling to an optical fiber and orienting a fiber tip of the optical fiber along a fiber axis toward the optical reflector, the fiber axis being nonparallel to the reflected beam centerline;

wherein the optical reflector is movable on the off-axis reflector surface in a direction generally parallel to an axis which is perpendicular to the ferrule holder support surface, prior to being mounted on the off-axis reflector support surface;

wherein the ferrule holder is movable on the ferrule holder support surface in a direction generally parallel to an axis which is perpendicular to the off-axis reflector support surface, prior to being mounted on the ferrule holder support surface; and wherein the apparatus has at least one of the following: (1) the optical reflector is movable on the off-axis reflector support surface in a direction generally parallel to the ferrule holder support surface prior to being mounted on the off-axis reflector support surface, and (2) the ferrule holder is movable on the ferrule holder support surface in a direction generally parallel to the off-axis reflector support surface prior to being mounted on the ferrule holder support surface.

2. The optical apparatus of claim 1 wherein the ferrule holder is rotatable on the ferrule holder support surface relative to an axis which is generally perpendicular to the ferrule holder support surface, prior to being mounted on the ferrule holder support surface.

3. The optical apparatus of claim 1 wherein the optical reflector is mounted on the off-axis reflector support surface by an adhesive and the ferrule holder is mounted on the ferrule holder support surface by an adhesive.

4. The optical apparatus of claim 1 wherein the ferrule holder support surface and the off-axis reflector support surface are planar surfaces, wherein the ferrule holder has a planar surface mounted on the ferrule holder support surface, and wherein the optical reflector has a planar surface mounted on the off-axis reflector support surface.

5. The optical apparatus of claim 1 wherein the mounting block is movable in a direction generally parallel to an axis which is perpendicular to the ferrule holder support surface.

6. The optical apparatus of claim 1 wherein the mounting block is rotatable relative to an axis which is generally perpendicular to the ferrule holder support surface and is rotatable relative to another axis which is generally perpendicular to the off-axis reflector support surface.

7. The optical apparatus of claim 1 wherein the ferrule is rotatable in the ferrule holder to adjust a polarization of a beam of the optical fiber.

8. The optical apparatus of claim 1 further comprising a fold mirror which is disposed in a path of the reflected beam centerline.

9. An off-axis reflective optical apparatus comprising:

a mounting block having a ferrule holder support surface and an off-axis reflector support surface which is generally perpendicular to the ferrule holder support surface;

an optical reflector mounted on the off-axis reflector support surface and having a reflected beam centerline, the optical reflector having a conic reflective surface and a conic center; and a ferrule holder mounted on the ferrule holder support surface, the ferrule holder providing a ferrule for coupling to an optical fiber and orienting a fiber tip of the optical fiber along a fiber axis toward the optical reflector, the fiber axis being nonparallel to the reflected beam centerline;

wherein, prior to mounting the optical reflector to the off-axis reflector support surface and prior to mounting the ferrule holder to the ferrule holder support surface, the optical reflector is movable on the off-axis reflector surface and the ferrule holder is movable on the ferrule holder support surface to align the conic center of the optical reflector with respect to the fiber tip of the optical fiber, and the apparatus has at least one of the following: (1) the optical reflector is movable on the off-axis reflector support surface to adjust a focus of the fiber tip with respect to the optical reflector, and (2) the ferrule holder is movable on the ferrule holder support surface to adjust the focus of the fiber tip with respect to the optical reflector.

10. The optical apparatus of claim 9 wherein the ferrule holder is rotatable on the ferrule holder support surface relative to an axis which is generally perpendicular to the ferrule holder support surface, prior to being mounted on the ferrule holder support surface.

11. The optical apparatus of claim 9 wherein the mounting block is movable in a direction generally parallel to an axis which is perpendicular to the ferrule holder support surface.

12. The optical apparatus of claim 9 wherein the mounting block is rotatable relative to an axis which is generally perpendicular to the ferrule holder support surface and is rotatable relative to another axis which is generally perpendicular to the off-axis reflector support surface.

13. The optical apparatus of claim 9 wherein the ferrule is rotatable in the ferrule holder to adjust a polarization of a beam of the optical fiber.

14. The optical apparatus of claim 9 wherein the ferrule holder support surface and the off-axis reflector support surface are planar surfaces, wherein the ferrule holder has a planar surface mounted on the ferrule holder support surface, and wherein the optical reflector has a planar surface mounted on the off-axis reflector support surface.

15. A method of mounting components in an off-axis reflective optical apparatus, the method comprising:
   providing a mounting block having a ferrule holder support surface and an off-axis reflector support surface which is generally perpendicular to the ferrule holder support surface;
   placing an optical reflector on the off-axis reflector support surface, the optical reflector having a reflected beam centerline, a conic reflective surface, and a conic center;
   placing a ferrule holder on the ferrule holder support surface, the ferrule holder providing a ferrule for coupling to an optical fiber and orienting a fiber tip of the optical fiber along a fiber axis to direct an incident light beam toward the optical reflector, the fiber axis being nonparallel to the reflected beam centerline;
   moving the optical reflector on the off-axis reflector surface and moving the ferrule holder on the ferrule holder support surface to align the conic center of the optical reflector with respect to the fiber tip of the optical fiber;
   moving at least one of (1) the optical reflector on the off-axis reflector support surface and (2) the ferrule holder on the ferrule holder support surface, to adjust a focus of the fiber tip with respect to the optical reflector; and
   mounting the optical reflector to the off-axis reflector support surface and mounting the ferrule holder to the ferrule holder support surface.

16. The method of claim 15 further comprising rotating the ferrule holder on the ferrule holder support surface relative to an axis which is generally perpendicular to the ferrule holder support surface to adjust a beam height of a reflected light beam to be reflected by the optical reflector from the incident light beam with respect to the off-axis reflector support surface, prior to mounting the ferrule holder on the ferrule holder support surface.

17. The method of claim 15 further comprising moving the mounting block in a direction generally parallel to an axis which is perpendicular to the ferrule holder support surface to adjust a lateral position of a reflected light beam to be reflected by the optical reflector from the incident light beam.

18. The method of claim 15 further comprising rotating the mounting block relative to an axis which is generally perpendicular to the ferrule holder support surface to adjust a pitch of a reflected light beam to be reflected by the optical reflector from the incident light beam.

19. The method of claim 15 further comprising rotating the mounting block relative to an axis which is generally perpendicular to the off-axis reflector support surface to adjust a yaw of a reflected light beam to be reflected by the optical reflector from the incident light beam.

20. The method of claim 15 wherein, to align the conic center of the optical reflector with respect to the fiber tip of the optical fiber, the optical reflector is moved on the off-axis reflector surface in a direction generally parallel to an axis which is perpendicular to the ferrule holder support surface and the ferrule holder is moved on the ferrule holder support surface in a direction generally parallel to an axis which is perpendicular to the off-axis reflector support surface.

21. The method of claim 15 wherein the optical reflector is moved on the off-axis reflector support surface in a direction generally parallel to the ferrule holder support surface to adjust the focus of the fiber tip with respect to the optical reflector.

22. The method of claim 15 wherein the ferrule holder is moved on the ferrule holder support surface in a direction generally parallel to the off-axis reflector support surface to adjust the focus of the fiber tip with respect to the optical reflector.

23. The method of claim 15 further comprising rotating the ferrule in the ferrule holder to adjust a polarization of the beam of the optical fiber.

24. The method of claim 15 further comprising moving the ferrule holder in a direction generally parallel to an axis which is perpendicular to the off-axis reflector support surface to align a pitch of a reflected light beam to be reflected by the optical reflector from the incident light beam.

* * * * *